(12) United States Patent
Limousin (10) Patent No.: US 8,272,196 B2
(45) Date of Patent: Sep. 25, 2012

(54) SIDE SEAL ASSEMBLY WITH INDEXING MECHANISM

(75) Inventor: Jean-Louis Limousin, Louisville, KY (US)

(73) Assignee: Lantech.com, LLC, Louisville, KY (US)

( * ) Notice: Subject to any disclaimer, the term of this patent is extended or adjusted under 35 U.S.C. 154(b) by 412 days.

(21) Appl. No.: 11/844,366

(22) Filed: Aug. 24, 2007

(65) Prior Publication Data
US 2009/0049803 A1 Feb. 26, 2009

(51) Int. Cl.
B65B 9/00 (2006.01)
B65B 51/26 (2006.01)

(52) U.S. Cl. ........................................................ 53/547

(58) Field of Classification Search .................. 53/548, 53/547, 552, 550; 83/170, 171, 477, 477.2, 83/491
See application file for complete search history.

(56) References Cited

U.S. PATENT DOCUMENTS

| | | | |
|---|---|---|---|
| 2,987,107 A | 6/1961 | Sylvester | |
| 3,279,936 A | 10/1966 | Forestek | |
| 3,502,493 A | 3/1970 | Forestek | |
| 3,762,253 A | 10/1973 | Loomis et al. | |
| 4,030,960 A | 6/1977 | Pratt | |
| 4,051,275 A | 9/1977 | Forestek | |
| 4,106,262 A | 8/1978 | Aterianus | |
| 4,219,988 A | 9/1980 | Shanklin et al. | |
| 4,341,057 A * | 7/1982 | Limousin | 53/553 |
| 4,534,819 A | 8/1985 | Payet et al. | |
| 4,717,372 A | 1/1988 | Herrington | |
| 4,858,416 A | 8/1989 | Monaghan | |
| 5,131,213 A | 7/1992 | Shanklin et al. | |
| 5,277,745 A | 1/1994 | Williams | |
| 5,371,999 A | 12/1994 | Hansen et al. | |
| 2,705,443 A | 4/1995 | Colby | |
| 5,417,041 A | 5/1995 | Hansen et al. | |
| 5,519,983 A | 5/1996 | Moen | |
| 5,603,801 A | 2/1997 | DeFriese et al. | |
| 5,761,878 A * | 6/1998 | Walkiewicz et al. | 53/373.5 |
| 6,027,596 A | 2/2000 | DeFriese et al. | |
| 6,325,127 B1 | 12/2001 | Waldrop | |
| 6,526,728 B1 | 3/2003 | Sorenson et al. | |
| 6,550,504 B1 * | 4/2003 | Leonardi et al. | 144/334 |
| 6,739,370 B2 | 5/2004 | Melheim | |
| 6,817,163 B2 * | 11/2004 | Limousin | 53/568 |

FOREIGN PATENT DOCUMENTS

EP 1658956 A2 5/2006
WO 2007005162 A2 1/2007

* cited by examiner

Primary Examiner — Lindsay Low
Assistant Examiner — John Paradiso
(74) Attorney, Agent, or Firm — Wood, Herron & Evans, LLP (57) ABSTRACT

A side seal assembly for a shrink wrap packaging system is located downstream in the feed direction from a wrapping station to join first and second plies together and enclose each of the products in individually wrapped packages. The side seal assembly includes a heated side seal mechanism to form the side seal weld and separate the selvage film. The assembly includes an indexing mechanism to index the side seal mechanism and expose a clean surface to the film without removal or extensive servicing of the assembly and the heretofore requisite downtime for the system. The sealing and cutting functions are combined into a single, stationary component thereby reducing the number of movable parts. Moreover, indexing the side seal mechanism operatively exposes a clean, free of resin build-up, peripheral edge of the side seal mechanism to the plies, without the need to stop production for extended periods of time while consistently producing a thin side seal weld on the package.

20 Claims, 8 Drawing Sheets

SIDE SEAL ASSEMBLY WITH INDEXING MECHANISM

BACKGROUND OF THE INVENTION

This invention relates generally to the art of film wrapping systems for use in wrapping objects with shrink wrap film and more particularly to improvements directed to making a side seal in the film.

A wide variety of systems are known for wrapping packages in thermoplastic film. Typical thermoplastic films utilized in such shrink wrap packaging systems include polyolefin, PVC and LDPE. More recent machines for wrapping packages in thermoplastic film utilize a continuous longitudinal or side sealer and an end sealer which moves at approximately the velocity of the packages as they travel through the machine so that it is not necessary to stop the packages while performing the end sealing operation.

One type of continuous side seal mechanism utilizes an elongate heated wire oriented in the direction of travel of the packages to heat and weld film plies and subsequently separate excess plastic film from the package. A variant of this type of side seal mechanism employs a fixed blade to heat and weld film plies, which simultaneously may cut the excess or waste film away from the welded seam. Another type of side sealing mechanism commonly utilized in shrink wrap packaging systems utilizes upper and lower rotating rollers or elements between which the plies of the film pass to form the weld. These rotary wheel side seal mechanisms employ a single mechanism to perform the dual operations of sealing the two plies of film together to form the weld and cutting the film to separate the excess selvage film outboard of the weld.

Side seal mechanisms of these and other prior art designs typically produce a relatively thick or wide seal on the wrapped package. One advantage of covering products in shrink wrap film is that the wrapping completely envelops the product without distracting from the aesthetic appeal of the package. Retailers and consumer product manufacturers desire packaging that does not interfere with nor detract from the product. A thick or wide side seal is therefore viewed as undesirable, particularly for low profile packages such as audio compact disc packages where the side seal is positioned on the thin side or height of the CD case.

Additionally, each of these prior techniques requires very high temperatures of the sealing mechanism to accomplish both the welding and separation functions. Typically, temperatures on the order of 500° F. or greater are required to heat the film to a molten state for separation of the selvage from the package.

Thus, while prior side seal mechanisms are seemingly simple, they require significant and complex maintenance efforts to maintain proper operation. The high temperatures required for separation of the selvage film results in sputtering of the molten film onto the components of the side seal mechanism. Such an accumulation of molten film or thermoplastic material on the heated welding or cutting mechanism may interfere with efficient heat transfer resulting in inferior weld formation and cutting operation. Additionally, the constant rubbing of the film on the cutting mechanism rubs off a coating on the cutting mechanism intended to increase thermal efficiency. Moreover, as a result of this inferior performance, the side sealer components must typically be serviced or repaired at least weekly and often daily.

Additionally, other complicating factors are involved in the servicing of these known side sealer mechanisms, which lead to extended service times. First there is an increased down time to allow for cooling of the system components. Moreover, these prior systems have relatively complicated disassembly and reassembly procedures to remove the film deposited on the components and maintain their serviceability. Finally, critical and detailed calibration and adjustment are required each time the side seal mechanism is broken down, cleaned and reassembled.

Therefore, a need exists in the shrink wrap packaging industry for a side seal mechanism which can readily accommodate a wide variety of film materials and repeatedly and consistently produce a thin, narrow, clean and accurate side seal weld and separation of the selvage material without the demanding service and maintenance requirements associated with known side seal mechanisms.

SUMMARY OF THE INVENTION

These and other objectives have been achieved with this invention, which in one embodiment includes a side seal assembly for a shrink wrap packaging system. The shrink wrap packaging system in one embodiment includes a feed conveyor to deliver a series of products to a wrapping station. The wrapping station may include a pair of film inverter rods, which are adjustable for spacing from one another to correspond to the height of the product being wrapped. A film delivery unit dispenses a supply of two-ply film in a direction generally perpendicular to the feed direction of the products. The two-ply film may be inverted by the inverter rods at the wrapping station where the products are inserted between the plies of the film. The system may also include a film inverter rod adjustment mechanism to adjust the spacing between the rods.

The shrink wrap system also includes a side seal assembly located downstream in the feed direction from the wrapping station to join the first and second plies together and enclose each of the products in individually wrapped packages. The side seal assembly includes a heated side seal mechanism to form the side seal weld and separate the selvage film. The assembly includes an indexing mechanism to index the side seal mechanism and expose a clean surface to the film without removal or extensive servicing of the assembly and the heretofore requisite downtime for the system. A heat shrink tunnel in one embodiment is located downstream from the sealing mechanisms to heat the film and thereby shrink it around the product as is well known in the industry.

Another aspect according to this invention is a method for wrapping a series of products in film. The method comprises the steps of serially feeding the products in a feed direction to a wrapping station, delivering film to the wrapping station, serially wrapping each of the products with the film, sealing the plies together to form a side seal weld with a stationary side seal mechanism, cutting a selvage portion of the film outboard of the side seal weld from a remainder of the film wrapped around the respective product with the side seal mechanism, and periodically indexing the side seal mechanism to expose a different portion thereof to the plies.

The side seal assembly according to this invention overcomes the problems and disadvantages associated with the prior side seal mechanisms. Advantageously, the sealing and cutting functions are combined into a single, stationary component thereby reducing the number of movable parts. Moreover, indexing the side seal mechanism operatively exposes a clean, free of resin build-up, peripheral edge of the side seal mechanism to the plies, without the need to stop production for extended periods of time while consistently producing a thin side seal weld on the package.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
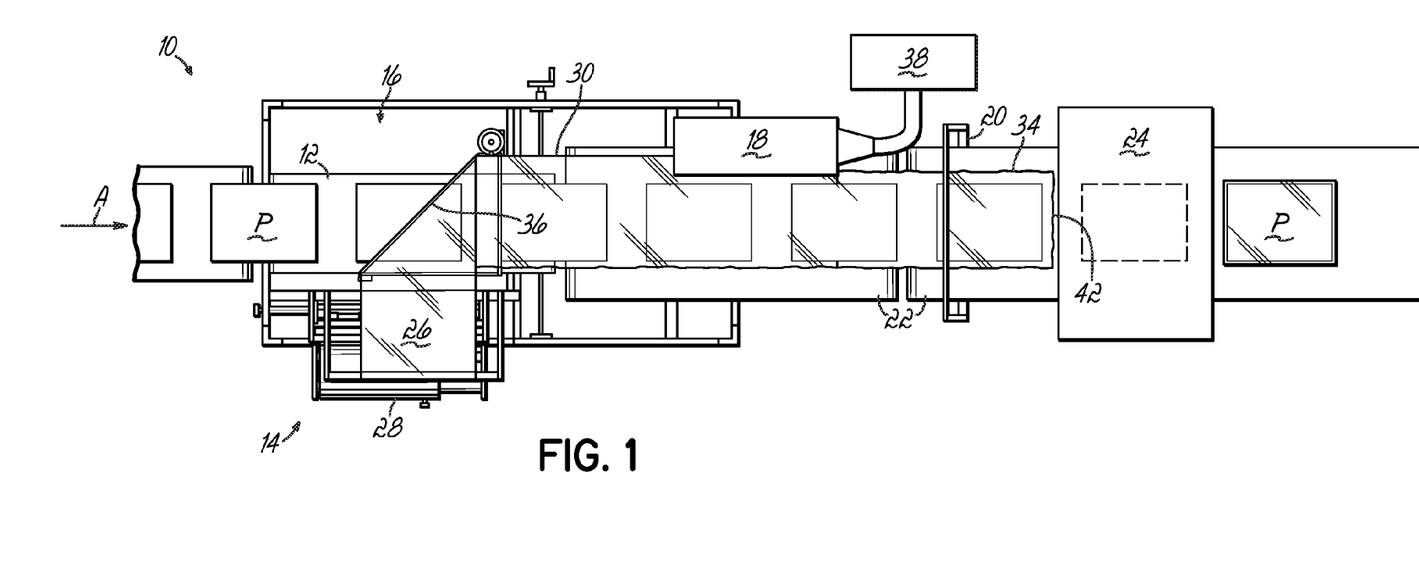
FIG. 1 is a top view of a film wrapping system and associated method according to one embodiment of this invention.

Referring now to FIG. 1, a top view of an exemplary automatic high-speed film wrapping system 10 according to one embodiment of this invention is shown. The system 10 generally includes a feed conveyor 12, a film delivery unit 14, a wrapping station 16, a side seal assembly 18, an end sealer 20, associated downstream conveyor(s) 22 and a heat shrink tunnel 24. Products P to be wrapped in film 26 enter the system 10 via a feed conveyor 12. The conveyor 12 delivers the spaced-apart and generally aligned products P to the wrapping station 16 where a folded film 26 from a film roll 28 in the film delivery unit 14 surrounds each product P. The folded film 26 enveloping each product is sealed proximate its free edges 30, 30 by the side seal assembly 18 to form a tube of film 26 enclosing the spaced products P. The film selvage 32 (FIG. 6) at the sealed edge 34 is severed and removed. The film 26 between the adjacent products P is sealed and severed at the end sealer 20 to produce individual sealed packages of the product P.

The system 10 wraps a product P in a flexible plastic film 26 in which the travel of the product P is essentially continuous through the system lo in a feed direction indicated by arrow A. The film 26 may be any one of a variety of films well known in the art including PVC, LDPE and polyolefin and is supplied to the system 10 as a folded web at right angles to the feed direction of the product P (shown in FIG. 1) through the system. The film 26 is provided to upper and lower inverter rods 36 of the wrapping station 16 where the film 26 is redirected and turned inside out to travel in the feed direction with the products P delivered by the feed conveyor 12.

The feed conveyor 12 pushes products P into the wrapping station 16 to cause them to be enclosed by the folded film 26 supplied by film delivery unit 14 on the top, bottom, and one side of the product P with the other side of the product P adjacent to the free edges 30, 30 of the folded film 26 being open initially. The product P thus enclosed in the web of film 26 travels with the film 26 past the side seal assembly 18 in FIG. 1 which seals the folded film 26 proximate and inboard of the two free edges 30, 30 together to form a continuous tube of film which envelops the succession of products P which are being fed into the system 10 by feed conveyor 12. The side seal mechanism 18 also severs the excess width 32 of film 26 from the tube. A selvage accumulator 38, such as a vacuum or other take-up mechanism, removes this selvage 32.

As the product P progresses further through the system 10, the end sealing mechanism 20 seals the trailing edge of each package while simultaneously sealing the leading edge 42 of the succeeding package in the system and it also severs one package from the other while the packages are traveling without stopping through the system 10. The end seal mechanism 20 in one embodiment is so designed that it travels a short distance with the product P at substantially the same velocity while the seal is being made. After the seal has been made, the sealing mechanism 20 releases from the film 26 and returns to its original position to repeat the transverse seal for the next product. The wrapped product may then be conveyed through the shrink tunnel 24 for shrinking of the film around the product. While exemplary embodiments of the film delivery unit 14, wrapping station 16, end sealer 20 and shrink tunnel 24 are shown and described herein as part of the system, specific models or embodiments of these and other components could readily be varied or changed as known by one of ordinary skill in this art without departing from the scope of this invention. One example of a film delivery unit compatible with this invention is described in U.S. Pat. No. 6,817,163, which is assigned to the assignee of this invention and hereby incorporated entirely by reference.

Because the product P being wrapped in the film 26 proceeds through the system 10 at a substantially uniform velocity, the system 10 is capable of operating at film web speeds as high as 120 feet per minute although 60 to 100 feet per minute is a more typical speed. The system 10 is capable of wrapping in excess of one product P per second.

Figure 2:
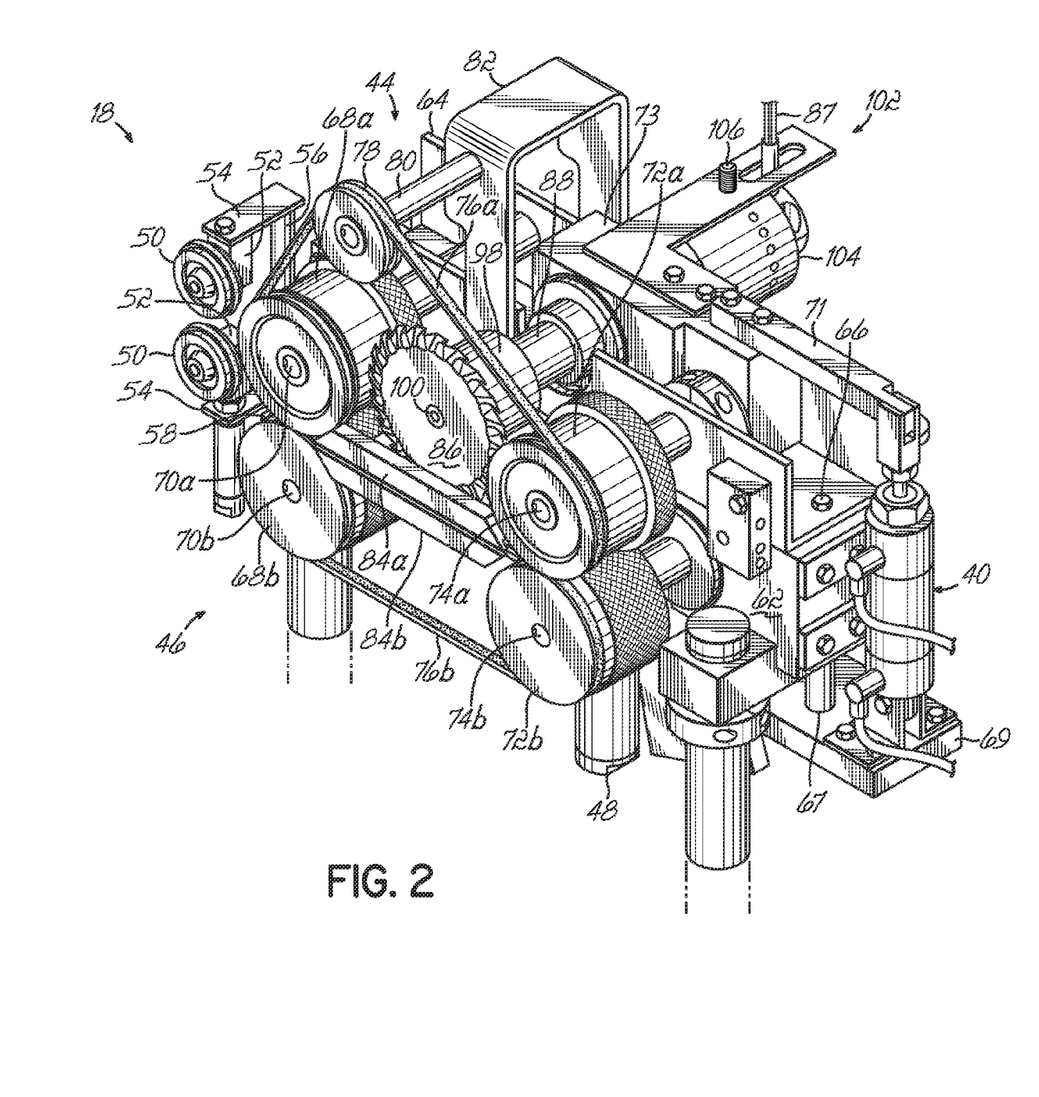
FIG. 2 is a perspective view of a side seal assembly of the system of FIG. 1.
Figure 3:
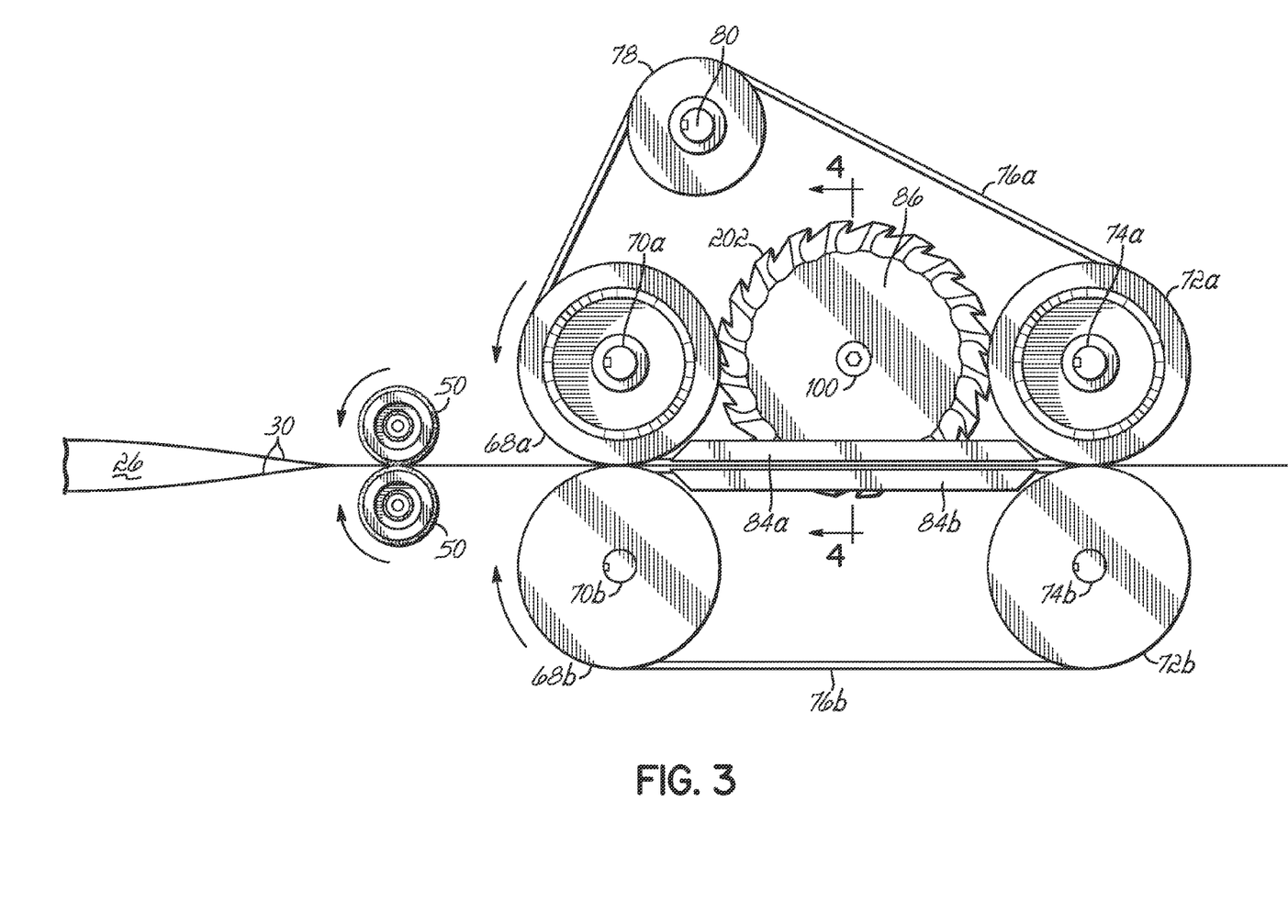
FIG. 3 is a side elevational view of components of the side seal assembly continuously joining plies of film to make a side seal weld.
Figure 4:
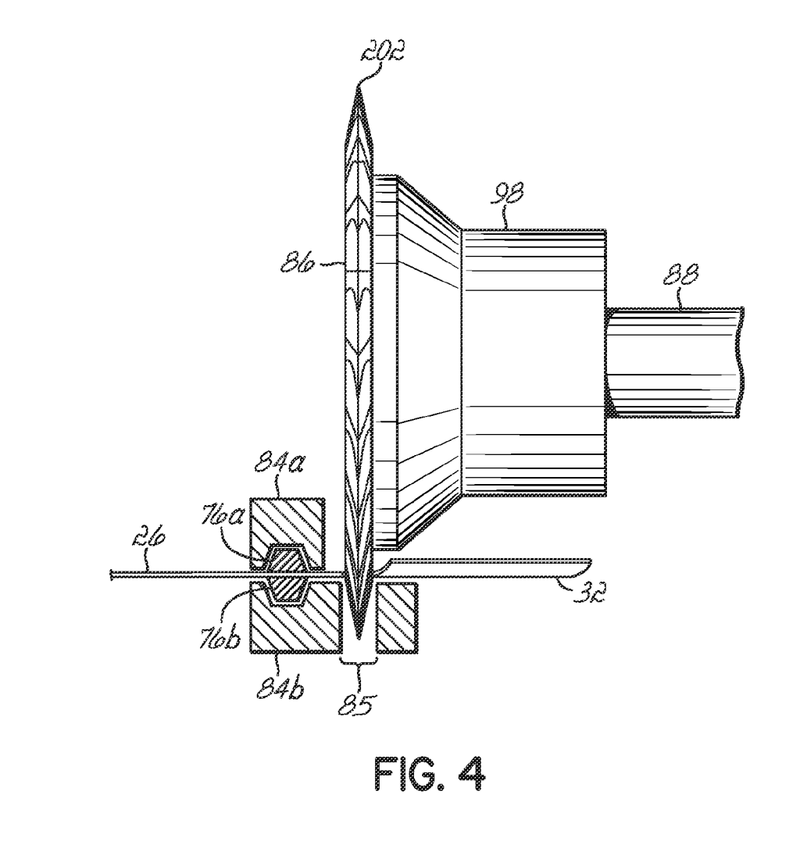
FIG. 4 is a cross-sectional view taken along line 4-4 of FIG. 3.
Figure 5:
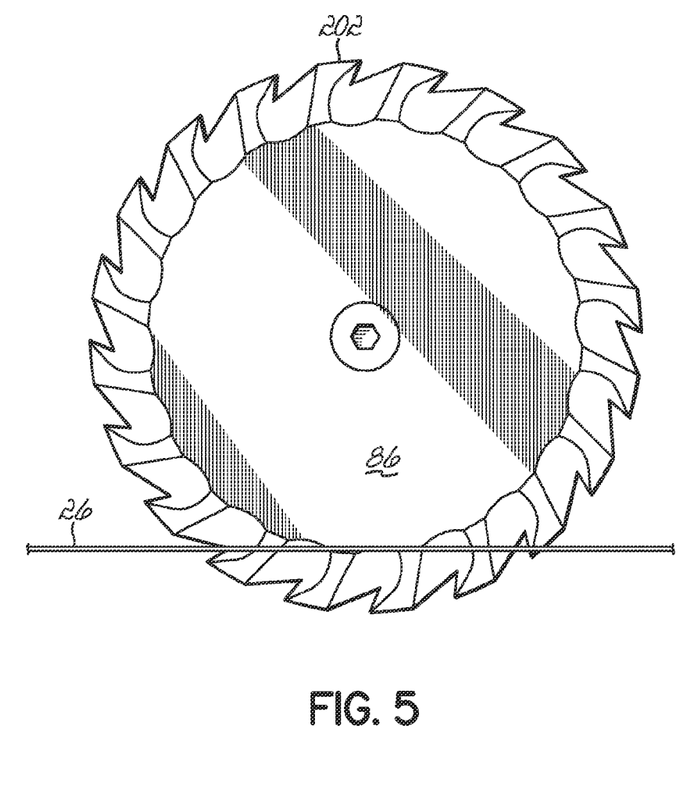
FIG. 5 is an isolated side elevational view of the side seal mechanism continuously joining plies of film to make a side seal showing one embodiment of the film path.

Turning now particularly to FIGS. 2-6, the novel side seal assembly 18 in accordance with this invention will be described. As shown in FIGS. 2 and 3, the side seal assembly 18 includes two jaws 44 and 46, the first jaw being a top or upper jaw 44 and the second being a bottom or lower jaw 46. The jaws 44, 46 are vertically movable relative to each other by a small pneumatic piston and cylinder arrangement 48. The pneumatic piston and cylinder arrangement 48 allows for vertical adjustment of the jaws 44, 46 relative to each other to allow for a spacing between the components for a user to feed the film 26 between the jaws 44, 46. A set of alignment rollers 50 are rotationally mounted to respective blocks 52 which are each secured to a plate 54 mounted on opposite ends of a post 56. A mounting block 58 secures the post 56 to the leading edge of a lower chassis 62.

The upper jaw 44 includes an upper chassis 64 and, likewise, the lower jaw 46 includes the lower chassis 62. Chassis screws 66 at opposite ends of the upper chassis 64 are secured to a post 67 mounted upon plate 69. A pneumatic piston 40 is also mounted on the plate 69 and linkage 71 is coupled to the upper end of the piston 40. The linkage 71 is also coupled to a mounting block 73, the function of which will be described later herein.

A pair of feed rollers 68a, 68b are provided downstream from the alignment rollers 50 adjacent the upstream end of the assembly 18. Each of the feed rollers 68a, 68b are mounted for rotation on a respective shaft 70a, 70b in the associated chassis 62, 64. A pair of discharge rollers 72a, 72b are located adjacent a downstream end of the side seal assembly 18 and each of the discharge rollers 72a, 72b are likewise rotationally mounted on a respective shaft 74a, 74b that is mounted in the associated chassis 62, 64.

A traction belt 76a runs about the feed roller 68a and discharge roller 72a, and which is elevated above the side seal mechanism 86 by idler pulley 78 so that belt 76a is not overly exposed to the heated side seal mechanism 86. Pulley 78 is rotationally mounted to shaft 80 that is secured to bracket 82 mounted to upper chassis 64. Conversely, lower traction belt 76b runs about feed roller 68b and discharge roller 72b. Traction belts 76a, 76b work in unison to pull the two free edges 30, 30 of the folded film 26 through the assembly 18 into contact with a side seal mechanism 86. Traction belts 76a, 76b are guided by their respective traction belt guides 84a, 84b, which are secured to upper and lower jaws 44, 46, respectively. The lower traction belt guide 84b has an opening 85 to accommodate the vertical adjustment of the peripheral edge 202 of the side sealing mechanism 86 below the vertical level of film 26.

The side seal assembly 18 according to this invention advantageously includes a side seal mechanism 86 that is stationary and operatively coupled to a heater (not shown) and an indexing mechanism 102. The side seal mechanism 86 is stationary in the sense that it is fixed or non-moving during the side seal operation; however, the mechanism 86 is adjustable without being removed from the assembly 18 as will be described herein. The side seal mechanism 86 is positioned between the feed and discharge rollers 68a, 72a and is mounted on hub 98 on the shaft 88 by single set screw 100. The side seal mechanism 86 is heated generally to a temperature greater than 350° F. to 600° F., typically to a temperature greater than 400° F. to 600° F., preferably to a temperature greater than 500° F. to 600° F.

The shaft 88 on which the side seal mechanism 86 is mounted is hollow so that electrical wiring 87 can be run to the sealing mechanism 86 to heat it. The shaft 88 projects from the upper chassis 64 through the block 73 such that when the side seal assembly 18 is not in operation, the piston 40 lifts the block 73 and the shaft 88 via linkage 71 so that the stationary side seal mechanism 86 is disengaged from the film 26. As such, the film 26 is not damaged or melted due to contact with the side seal mechanism 86 when the assembly 18 is not in operation. As the system 10 begins to wrap and seal products, the piston 40 draws the stationary side seal mechanism 86 downwardly via linkage 71 and block 73 into sealing operational contact with the film 26 for production.

The side seal assembly 18 holds two free edges 30, 30 of the folded film 26 together, and guides the layers through the side seal mechanism 86. The side seal mechanism 18 seals the two plies to form a side seal weld and separates a selvage portion 32 (FIG. 6), which is guided away so as not to reattach to the newly formed weld.

Figure 6:
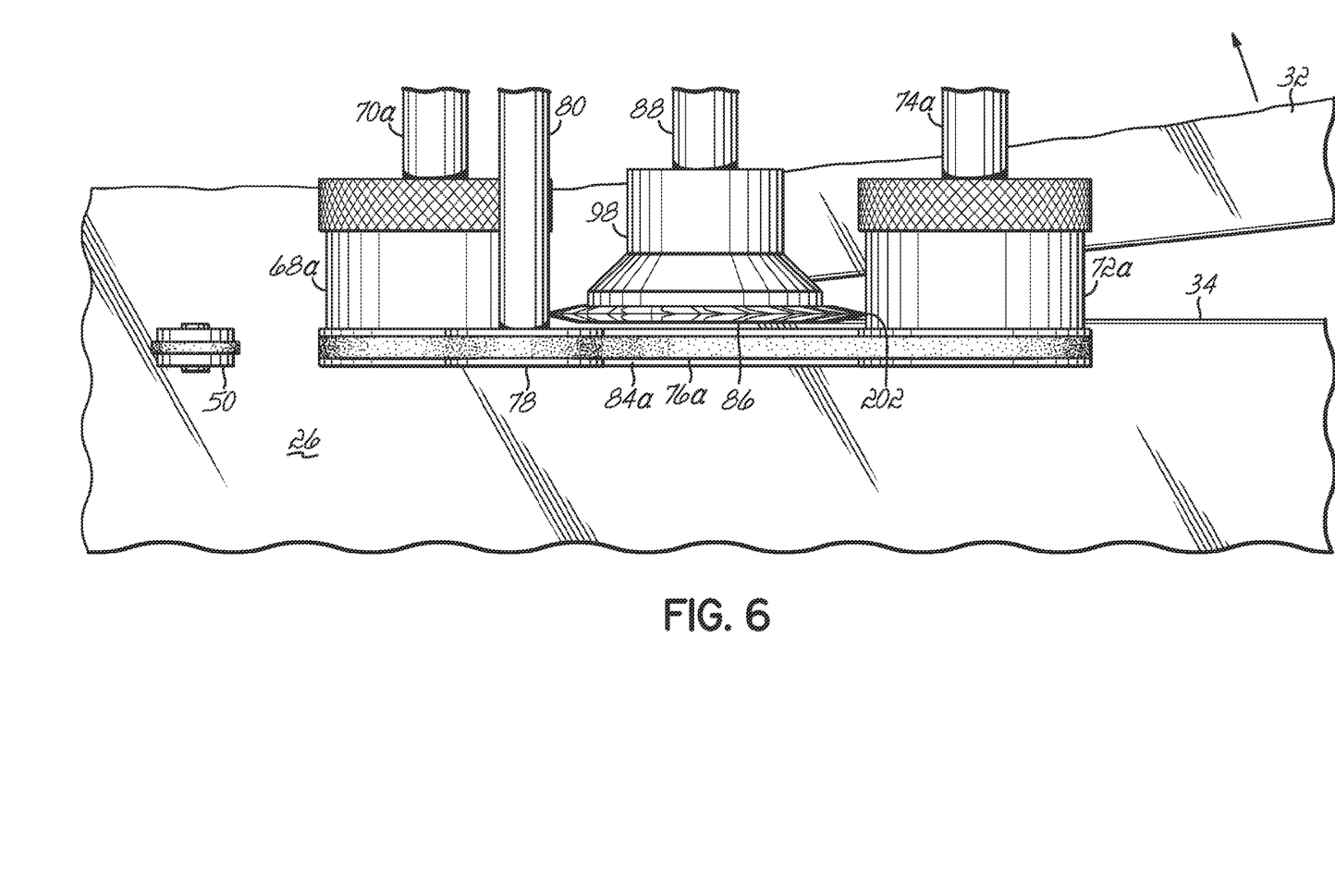
FIG. 6 is a top plan view of components of the side seal assembly forming the side seal weld and cutting selvage film from the remainder of the film.

The shaft 88 on which the side seal mechanism 86 is mounted is hollow so that electrical wiring (not shown) can be run to the sealing mechanism 86 to heat it. The mechanism 86 can be indexed so a rotary electrical connection (not shown) of known type may be used so that twisting of the wiring does not occur. The electrical wiring engages a circular ceramic heater element (not shown) seated within the sealing mechanism 86 with the heat extending toward the film plies 26 and sealing an adjacent area of the film 34 (FIG. 6). Also, a temperature controller (not shown) may be incorporated to accommodate various types of film 26.

Figure 7A:
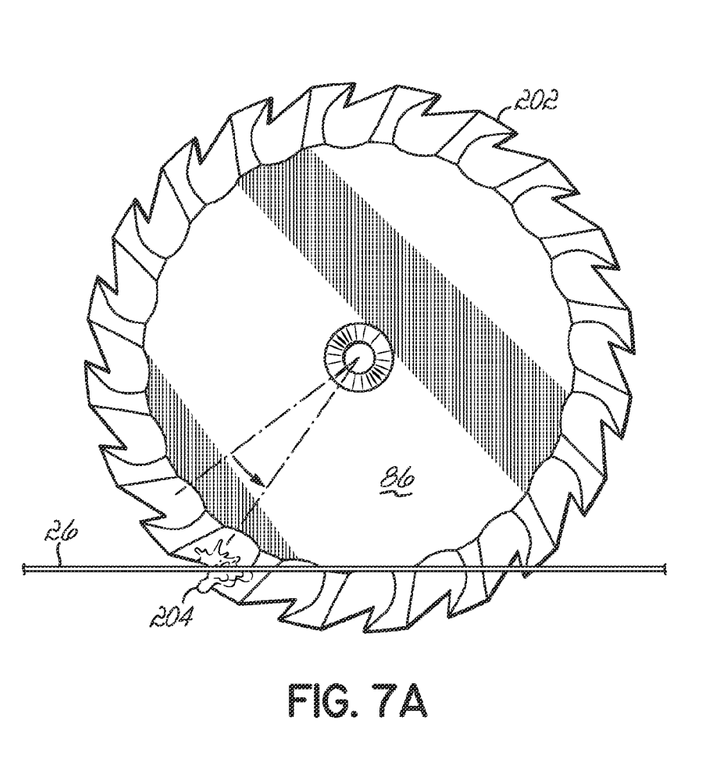
FIG. 7A is a side elevational view of the side seal mechanism continuously joining plies of film to make a side seal showing one embodiment of the film path prior to indexing.
Figure 8:
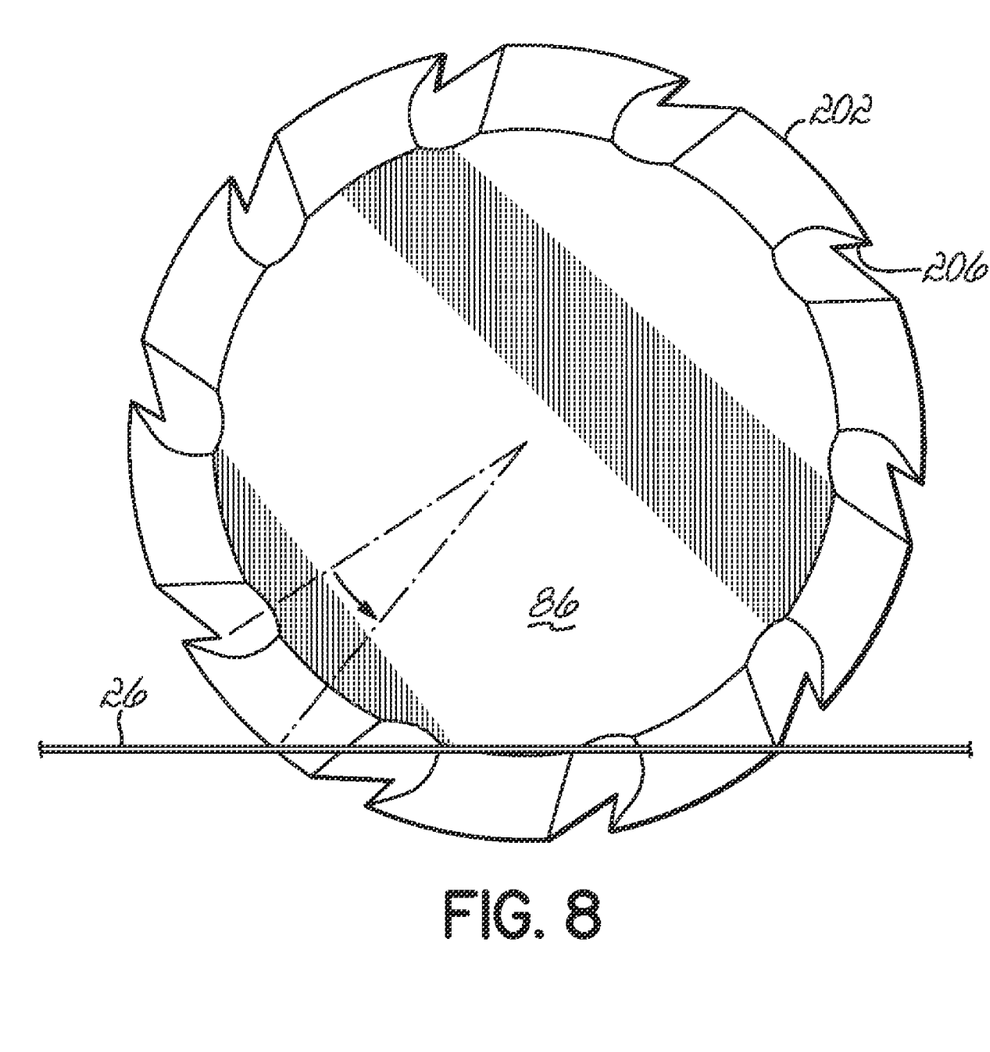
FIG. 8 is a side elevational view of the side seal mechanism continuously joining plies of film to make a side seal showing an alternative embodiment of the film path prior to indexing.

The shaft 88 is operatively coupled to an indexing mechanism 102 which may be manually indexed by disengaging a locking mechanism 106 from an index housing 104, thereby exposing a different region of peripheral edge 202 of the side seal mechanism 86 to the film (see FIG. 2). As shown in FIGS. 7A and 8, the side seal mechanism 86 is indexed through an angle of rotation to expose a different portion of the mechanism 86 to the film 26 for sealing. Additionally, the path of the film 26 may be adjusted relative to the center of the mechanism 86 to increase or decrease the dwell downtime or exposure of the film 26 to the heated sealing mechanism 86. The side seal mechanism 86 can be locked in the new position by again engaging the locking mechanism 106 with the index housing 104. Alternatively, the heated stationary side seal mechanism 86 may be indexed automatically based on a measurable variable, such as, the operating temperature of the side seal mechanism 86, thickness of the film 26, average speed of film 26 traveling in feed direction A, vertical height of the side seal mechanism 86, degree of sealing of the film 26, accumulated operating time or any combination thereof, to provide a clean, free of resin build-up 204, peripheral edge 202.

Figure 7B:
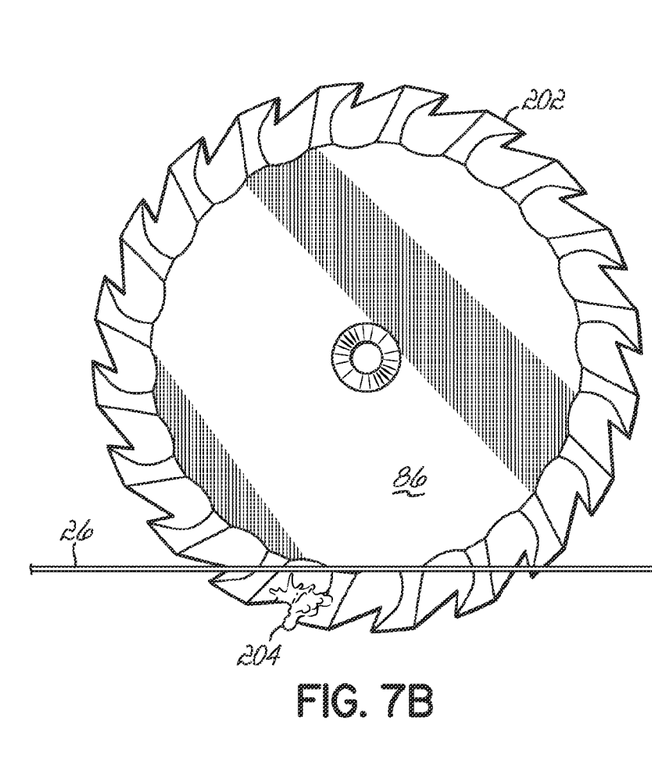
FIG. 7B is a side elevational view of the side seal mechanism continuously joining plies of film to make a side seal showing one embodiment of the film path after indexing.

Referring to FIGS. 7A and 7B, during operation the elevated temperatures required for forming weld 34 and separation of the selvage film 32 results in sputtering and accumulation of the molten film 26 onto the surface of mechanism 86. Over time, such an accumulation of molten film 26 on the mechanism 86 and its peripheral edge 202 may interfere with efficient heat transfer to the film 26 and result in inferior weld 34 formation. Accordingly, the side sealing mechanism 86 may be indexed to expose a different portion of the peripheral edge 202 of the mechanism 86, which is clean and free of resin build-up.

Figure 9A:
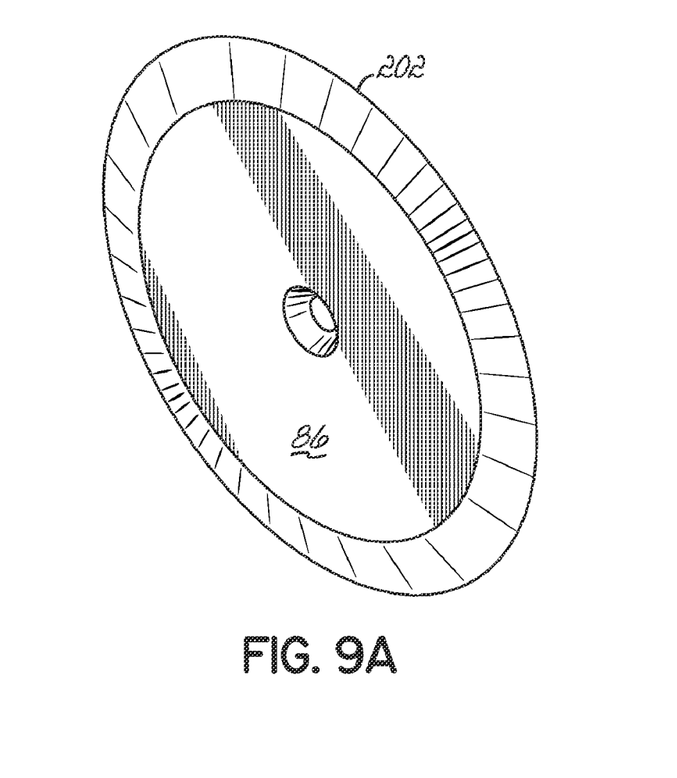
FIG. 9A is a perspective view of an alternative embodiment of the side seal mechanism.
Figure 9B:
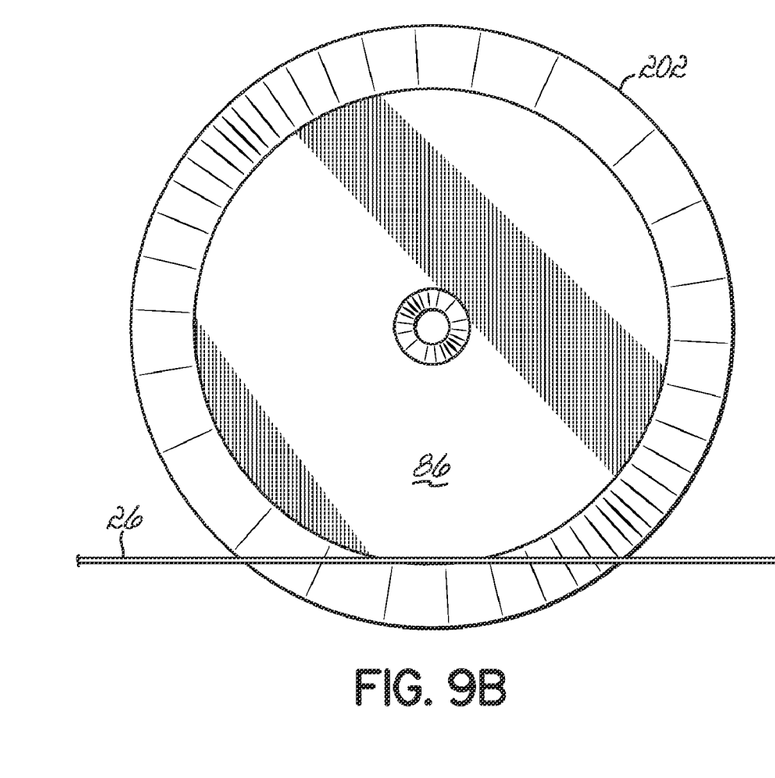
FIG. 9B is a side elevational view of the alternative embodiment of the side seal mechanism shown in FIG. 9A continuously joining plies of film to make a side seal.

In one embodiment shown in FIGS. 9A and 9B, the side seal mechanism 86 is generally circular, but alternatively it may also be generally shaped as an n-sided polygon where n is equal to or greater than 5. The side seal mechanism 86 may be further characterized with a beveled peripheral edge 202. In an alternative embodiment, it may be desirable to include a plurality of beveled notches 206 at the peripheral edge 202.

To produce a thin, clean weld 34 and to accommodate appropriate welding and cutting temperatures the side seal mechanism 86 in one embodiment is cold rolled steel or aluminum, which is coated with process such as TFE-LOK® in which PTFE particles are embedded into the surface of the mechanism 86. The TFE-LOK® provides enhanced heat conductivity to the sealing mechanism 86. The coating process for the mechanism 86 may be accomplished according to U.S. Pat. Nos. 3,279,936; 3,502,493 and 4,051,275, each of which is hereby incorporated by reference entirely. Due in part to the thermally efficient conductivity afforded to the sealing mechanism 86 by such a coating, the sealing mechanism 86 of this invention may be significantly thinner than some prior systems.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

I claim:
1. A system for wrapping products in film comprising:
a feed conveyor adapted to deliver a series of products in a feed direction;
a film delivery unit adapted to dispense a supply of film having first and second plies each having a free edge;

a wrapping station adapted to receive the film from the film delivery unit and to wrap each of the products delivered thereto by the feed conveyor and juxtapose the free edges of the first and second plies proximate one another;

a side seal assembly located downstream in the feed direction from the wrapping station to join the first and second plies together inboard of the respective free edges of the plies to form a side seal weld;

wherein the side seal assembly includes:

(a) a heated and stationary side seal mechanism adapted to both seal the first and second plies to form the side seal weld and separate a selvage portion of the plies outbound of the side seal weld, the side seal mechanism being stationary in rotation when at least one of the feed conveyor and the film delivery unit is in operation;

(b) a heater operatively coupled to said side seal mechanism; and (c) an indexing mechanism operatively coupled to said side seal mechanism to index the side seal mechanism and expose a different portion of the side seal mechanism to the plies.

2. The system of claim 1, wherein said side seal mechanism is further characterized by a beveled peripheral edge.

3. The system of claim 2, wherein said side seal mechanism is generally shaped as an n-sided polygon with n equal to or greater than 5.

4. The system of claim 3, wherein said side seal mechanism includes a plurality of beveled notches located at said beveled peripheral edge.

5. The system of claim 2, wherein said side seal mechanism is generally circular.

6. The system of claim 5, wherein said side seal mechanism includes a plurality of beveled notches located at said beveled peripheral edge.

7. The system of claim 1 further comprising:

an end seal mechanism located downstream in the feed direction from the wrapping station to join the first and second plies together in a direction generally perpendicular to the feed direction.

8. The system of claim 1 further comprising:

a heat shrink tunnel located downstream in the feed direction from the wrapping station to heat the film and thereby shrink it around the product.

9. The system of claim 1 wherein said indexing mechanism is manual to expose a clean, free of resin build-up, peripheral edge of the side seal mechanism to the plies.

10. The system of claim 1 wherein the side seal mechanism is adapted to heat the film to a temperature greater than 350° F. to 600° F.

11. The system of claim 9 wherein the side seal mechanism is adapted to heat the film to a temperature greater than 400° F. to 600° F.

12. The system of claim 1 further comprising:

a coating on at least a portion of said side seal mechanism, said coating being adapted to enhance thermal conductivity properties of said at least a portion of said side seal mechanism.

13. The system of claim 1 wherein the side seal mechanism is a single component.

14. The system of claim 13 wherein the side seal mechanism is adapted to separate the selvage portion conterminous to a location at which the first and second plies are sealed together.

15. The system of claim 1 wherein the side seal mechanism is positioned such that the first and second plies intersect the side seal mechanism along a chord of the side seal mechanism.

16. The system of claim 15 wherein a position of the side seal mechanism relative to the first and second plies intersecting the side seal mechanism is adjustable in a direction generally perpendicular to the plane of the first and second plies.

17. The system of claim 1 wherein the indexing mechanism is operative to index the side seal mechanism only when at least one of the feed conveyor and the film delivery unit is not in operation.

18. A system for wrapping products in film comprising:

a feed conveyor adapted to deliver a series of products in a feed direction;

a film delivery unit adapted to dispense a supply of film having first and second plies each having a free edge;

a wrapping station adapted to receive the film from the film delivery unit and to wrap each of the products delivered thereto by the feed conveyor and juxtapose the free edges of the first and second plies proximate one another;

a side seal assembly located downstream in the feed direction from the wrapping station to join the first and second plies together inboard of the respective free edges of the plies to form a side seal weld;

wherein the side seal assembly includes:

(a) a heated and stationary side seal mechanism comprising a single component adapted to both seal the first and second plies to form the side seal weld and separate a selvage portion of the plies outbound of the side seal weld, wherein the side seal mechanism is positioned such that the first and second plies intersect the side seal mechanism along a chord of the side seal mechanism, the side seal mechanism being stationary in rotation when at least one of the feed conveyor and the film delivery unit is in operation;

(b) a heater operatively coupled to said side seal mechanism;

(c) an indexing mechanism operatively coupled to said side seal mechanism to index the side seal mechanism and expose a different portion of the side seal mechanism to the plies, wherein the indexing mechanism is operative to index the side seal mechanism only when at least one of the feed conveyor and the film delivery unit is not in operation;

wherein the side seal mechanism is adapted to separate the selvage portion conterminous to a location at which the first and second plies are sealed together;

wherein a position of the side seal mechanism relative to the first and second plies intersecting the side seal mechanism is adjustable in a direction generally perpendicular to the plane of the first and second plies;

an end seal mechanism located downstream in the feed direction from the wrapping station to join the first and second plies together in a direction generally perpendicular to the feed direction; and a heat shrink tunnel located downstream in the feed direction from the wrapping station to heat the film and thereby shrink it around the product.

19. A system for wrapping products comprising:

a supply of film;

a feed conveyor adapted to deliver a series of products in a feed direction;

a film delivery unit to dispense the supply of film having first and second plies each having a free edge;

a wrapping station receiving the film from the film delivery unit wrapping each of the products delivered thereto by the feed conveyor and juxtaposing the free edges of the first and second plies proximate one another;

a side seal assembly located downstream in the feed direction from the wrapping station and joining the first and second plies together inboard of the respective free edges of the plies to form a side seal weld;

wherein the side seal assembly includes:

(a) a heated and stationary side seal mechanism to both seal the first and second plies to form the side seal weld and separate a selvage portion of the plies outbound of the side seal weld, the side seal mechanism being stationary in rotation when at least one of the feed conveyor and the film delivery unit is in operation;

(b) a heater operatively coupled to said side seal mechanism; and (c) an indexing mechanism operatively coupled to said side seal mechanism to index the side seal mechanism and expose a different portion of the side seal mechanism to the plies.

20. The system of claim 19 wherein the side seal mechanism is a single component to separate the selvage portion conterminous to a location at which the first and second plies are sealed together and the side seal mechanism is positioned such that the first and second plies intersect the side seal mechanism along a chord of the side seal mechanism and the indexing mechanism is operative to index the side seal mechanism only when at least one of the film delivery unit and the feed conveyor is not in operation.

* * * * *